July 23, 1935.  G. CHRISTENSON  2,008,682
RING PACKING
Filed Sept. 19, 1932
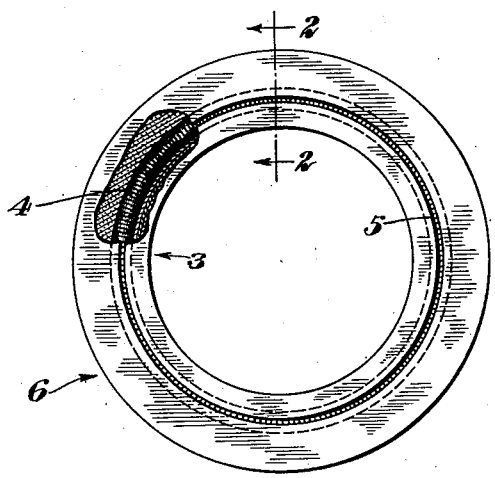
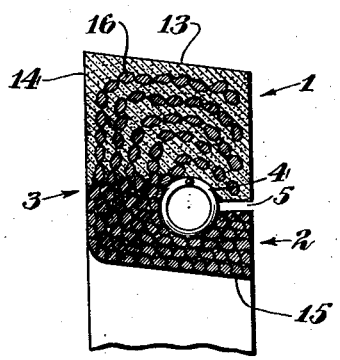
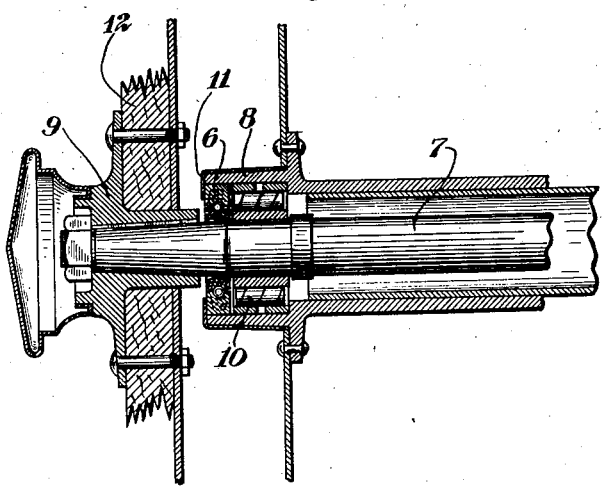
INVENTOR
George Christenson.
BY D.N.Halstead.
ATTORNEY Patented July 23, 1935

2,008,682

UNITED STATES PATENT OFFICE 2,008,682

RING PACKING

George Christenson, Plainfield, N. J., assignor to Johns-Manville Corporation, New York, N. Y., a corporation of New York Application September 19, 1932, Serial No. 633,833

4 Claims. (Cl. 288—1)

This invention relates to a lubricant-retaining washer or packing, as, for example, ring packing adapted for use on a rotating round member and to a method of making the same.

The invention comprises a shaped and then hardened packing adapted to retain its shape during use. A typical embodiment is a ring packing including a difficultly yielding body portion of rubber compound or the like, a flexible lip concentric with and disposed within the body portion and united thereto at its side portion, and means disposed between the said body portion and lip for improving or tightening the engagement of the lip with the moving surface that is to be packed. In the preferred form, the lip has a lower susceptibility to softening and change in frictional characteristics at an elevated temperature than the body portion.

The invention is particularly applicable to packing in an automobile axle assembly, for the purpose of preventing the passage of oil or grease from the differential, for example, through the housing around the axle to the brakes on the rear wheels. There have been proposed heretofore special shapes of felt or leather washers, in shape-retaining assemblies, to prevent this leakage.

To the packing elements previously proposed there is considerable objection. Felt is oil-permeable. Also, leather is somewhat permeable to oil and is of a degree of softness that varies with the extent of saturation with oil. Furthermore, leather washers or packing elements are not adapted to withstand high temperatures for a long time without change in the packing or frictional characteristics. This weakness is especially important in the newer automobiles which are constructed to operate at very high speed. Further, the washers that have been proposed are in many cases not adapted to maintain their shape without the assistance of metal parts or housings.

It is an object of the present invention to provide a packing member that obviates the disadvantages of conventional lubricant-retaining members that have been mentioned.

The invention is illustrated in the drawing, in which,

Fig. 1 is a face view of the embodiment of the invention that is preferred at this time, in part broken away for clearness of illustration;

Fig. 2 is a cross sectional view on the line 2—2 of Fig. 1; and

Fig. 3 is a sectional view of an assembly showing the improved packing ring in position around an automobile axle.

In the various figures like reference characters denote like parts.

There is shown a ring packing including a body or backing portion 1 that is suitably composed of a non-porous, heat-resistant composition, such as rubber or rubber compound and heat-resistant reenforcing means 16. The reenforcement may consist of a woven fabric, such as wire-inserted asbestos cloth into which the rubber or rubber compound is thoroughly impregnated. The flexible lip 2 is attached at its side portion 3 to the said body portion. The flexible lip and body portion in the packing that is illustrated are ring-shaped and are concentric. The lip is disposed inside the body portion and contacts on its inner surface with the moving surface that is packed, as illustrated in Fig. 3.

To improve the contact of the packing lip with the moving surface there is provided an annular, coiled pull spring 4 which is seated in the groove 5 between the lip and the body portion.

The assembly shown in Fig. 3 represents a part of a rear axle assembly of an automobile. There are shown here the packing ring 6 with pull spring in position. The other parts illustrated include the axle 7, axle housing 8, hub 9, bearing race 10, flanged ring 11, which, with the bearing race, maintains the packing ring in position and prevents its displacement lengthwise of the axle, and spokes 12. The housing 8 contacts with the rear or outer surface of the packing 6 and prevents the passage of oil thereby, that is, past that surface of the packing. It will be understood that the housing is connected, at its end remote from the hub, with the housing of the differential gears, which is a source of oil or grease that has access to the housing 8 and through it, to the packing 6. The differential is not illustrated, as it is conventional.

The lip consists essentially of a resilient, non-porous, wear and heat-resistant composition. It may consist of rubber and asbestos cloth, for example. However, it is preferable in packing a high speed part to have the contacting lip of lower susceptibility to change in consistency and frictional characteristics at an elevated temperature than the rubber body portion, since the lip is exposed to higher temperatures. A material that I have used with particular advantage, in association with asbestos cloth reenforcement in the packing lip, is polymerized chloro-2-butadiene-1, 3, of the formula $CH_2:CCl.CH:CH_2$, herein referred to as chloroprene, and made as described by Carothers and others in the Journal of the American Chemical Society, vol. 53, pages 4203-6, 1931. As shown in this publication, the chloroprene has greater resistance to elevated temperatures and to oil than rubber. In the completely polymerized state in which it is initially used, the chloroprene has a consistency approximating that of raw rubber.

The articles of the present invention may be made by a method which comprises shaping and then hardening the selected compositions. This general method is illustrated in more detail by the following specific example:

Asbestos cloth consisting of woven asbestos yarn is impregnated with rubber, as, for example, by a method including immersion of the cloth in a rubber solution and/or calendering rubber upon the surface of the cloth. The resulting rubberized cloth is then cut into strips of suitable width. There are made also strips of material in which chloroprene is substituted for the rubber in the impregnation and/or coating of the cloth. There is then made an assembly of several strips of each kind, the rubber composition strips being placed to the side which is to form the body portion in the finished article and the chloroprene composition being placed at the side that is to constitute the lip. These assemblies or stacks are brought together at their side and the several strips of the two kinds are alternated and overlapped at a side edge portion of each. The assembly is then transferred to a steam-heated die in which the male die is provided with a properly located, circular ridge. The die is then closed, pressure is applied to shape the article and provide therein a groove corresponding to the said ridge in the die, and the shaped article is partially hardened, as by being maintained for approximately fifteen minutes at a temperature corresponding to that produced by steam in the die at 70 pounds gauge pressure. The die is then opened and the coiled annular spring 4 is placed in the bottom of the said groove. The article carrying the spring is then transferred to the final shaping and hardening die in which it is pressed to approximately the exact shape desired and is further hardened, as by being maintained for 45 minutes at a temperature correspondng to steam at 70 pounds gauge pressure.

During the final pressing operation, the groove is partly closed over the spring, as illustrated in the figures, in such manner as to increase the certainty of engagement of the spring within the groove.

The die pressing treatment at an elevated temperature causes the union of the chloroprene and rubber, these two being miscible with each other as initially used, vulcanizes the rubber, and, at the same time, polymerizes the chloroprene beyond the state of its initial polymerization. The term "polymerization" is used herein as synonymous with hardening on being heated, without commitment to any theory to explain the cause of the hardening.

After the die pressing and hardening are completed, the product is removed from the die and is smoothed or trimmed over any irregularities of surface thereof.

Since the composition is first shaped to desired form and then hardened, it is possible to establish slopes or configurations of surface that conform closely with the surfaces that are to be packed. Thus, it is possible to provide a surface 13 of the edge of the body portion that is plain and either at right angles to the surface 14 or sloped, as illustrated, for example, in Fig. 2. Likewise, the edge 15 of the packing lip or flange may be sloped to conform to a tapered automobile axle against which the lip contacts in use. Oil pressure acting upon the face upon which the groove 5 opens tends to cause flexing of the lip away from the body portion and to tighten the contact with the packed surface at the time when thorough packing is most needed, that is, when pressure is tending to cause flow of oil along the packed surface. The general direction of the depth of the groove is at a right angle to the face of the packing ring, as illustrated; the readily stretched material of which the lip is composed makes possible its close engagement, under the influence of the pull spring, against the packed surface.

The body portion, as illustrated, may be relatively rigid and adapted to maintain the shape of the packing ring without the provision of any special elements in the wheel assembly for maintaining the shape of the packing. For example, the shape-retaining body portion is adapted to retain, in approximately preestablished position, the base of the lip secured to the body portion. On the other hand, the flange is made relatively thin and flexible, so that the pull spring may hold the lip in close contact with the surface that is to be packed.

It has been found by test that lubricant-retaining washers of the type described are far superior to the conventional types comprising a felt or leather packing element.

The details that have been given are for the purpose of illustration and not description, and many variations therefrom may be made without departing from the spirit and scope of the invention.

What I claim is:

1. A ring packing element including a difficultly yielding body portion comprising rubber, a lip more readily yielding than the said body portion disposed inwardly and concentrically with respect to the said body portion and integrally united thereto at a side portion, and means disposed between the said body portion and lip for improving the engagement of the lip with a packed surface, the said lip consisting essentially of a resilient, non-porous, wear-resistant composition more resistant to elevated temperatures than the said body portion.

2. A ring packing element including a difficultly yielding body portion comprising rubber, a flexible lip disposed inwardly and concentrically with respect to the said body portion and integrally united thereto at the side portion, and means disposed between the said body portion and lip for improving the engagement of the lip with a packed surface, the said lip consisting essentially of a resilient, non-porous, wear and heat-resistant composition comprising a substantial proportion of chloroprene.

3. A ring packing element including a difficultly yielding body portion comprising rubber, a flexible lip disposed inwardly and concentrically with respect to the said body portion and integrally united thereto at the side portion, and means disposed between the said body portion and lip for improving the engagement of the lip with a packed surface, the said lip consisting essentially of a resilient, non-porous, wear and heat-resistant composition comprising a substantial proportion of chloroprene and reenforcement therefor including fibers of the type of asbestos associated with the chloroprene.

4. An oil retaining ring adapted for use in connection with an automobile axle comprising a body portion and a flexible lip secured at one side to the said body portion, the body portion being adapted to retain the base of the lip in approximately preestablished position, the body portion and lip including each a binder and reenforcing fibers associated therewith, and the binder in the lip being more resistant to elevated temperatures and oil than the binder in the said body portion.

GEORGE CHRISTENSON.